United States Patent [19]

Nasser

[11] 4,077,863
[45] Mar. 7, 1978

[54] PRESSURE ELECTROLYZER

[75] Inventor: Gamal El Din Nasser, Puchheim, Germany

[73] Assignee: Linde Aktiengesellschaft, Wiesbaden, Germany

[21] Appl. No.: 737,200

[22] Filed: Oct. 29, 1976

[30] Foreign Application Priority Data

Oct. 30, 1975 Germany ............................ 2548699

[51] Int. Cl.² .......................... C25B 1/02; C25B 9/00
[52] U.S. Cl. .................................. 204/268; 204/129;
204/256; 204/270; 204/274
[58] Field of Search ............... 204/268, 269, 270, 254,
204/256, 258, 266, 262, 274, 278, 129

[56] References Cited

U.S. PATENT DOCUMENTS

| | | | |
|---|---|---|---|
| B 505,126 | 2/1976 | Stedman | 204/129 X |
| 1,600,478 | 9/1926 | Lanaczeck | 204/270 |
| 2,494,264 | 1/1950 | Ryman | 204/258 X |
| 3,379,634 | 4/1968 | Rutkowski | 204/258 |
| 3,652,431 | 3/1972 | Reynolds | 204/129 |
| 3,661,753 | 5/1972 | Aylward et al. | 204/129 X |

OTHER PUBLICATIONS

Koehler, "Electrochemistry", vol. II, John Wiley & Sons, 2nd ed., pp. 356 & 357.

*Primary Examiner*—Arthur C. Prescott
*Attorney, Agent, or Firm*—Millen & White

[57] ABSTRACT

In a pressure electrolyzer suitable for the electrolysis of water or hydrochloric acid or sodium chloride provided with bipolar electrodes forming a plurality of cell units arranged in the form of a cell block, the improvement which comprises a housing for the cell block, said housing being a pressure vessel designed for pressures of at least 1.1 bars, and further comprising said cell block having a square configuration, openings for the electrolyte being disposed on the underside of said cell block, said cells being arranged in a U-shaped turn, a mounting for the cell block and current leads attached exclusively to one end of said cell block and to one diameter of the side wall of the pressure vessel, said vessel having a cylindrical configuration, cooling means extending along the outside of said cell block, filter mat means being disposed in the flow path of the electrolyte upstream of the cooling means and means for conducting the electrolyte through said filter mat and cooling means and said openings for the electrolyte into the interior of the cell block.

6 Claims, 9 Drawing Figures

PRESSURE ELECTROLYZER

BACKGROUND OF THE INVENTION

This invention relates to apparatus for the electrolysis of a liquid under pressure.

Industrial scale pressure electrolyzers are formed from a plurality of cell parcels or units and assembled into a cylindrical block. The cell units are usually designed to have a round configuration so as not to buckle against pressure. In these systems, the assembly is held together against the internal pressure by tie rods in the direction of the longitudinal axis. The seals between the cells must be constructed so that they can withstand the internal pressure. In this form of construction, the electrolyzers can be produced at a reasonable cost if designed to be used only with pressures of up to about 30 bars. Besides, rather expensive embossing tools are required for producing the round electrodes and especially the separator sheets (the diaphragms) which generally have nub-like embossings, since these parts must be embossed in one piece. For these reasons, the electrolyzers employed heretofore were limited within relatively narrow limits with respect to their size and amount of throughput. For example, the largest known electrolyzers for the pressure electrolysis of water yield about 1000 $Nm^3$ of hydrogen per hour. For further information on such electrolyzers, reference is invited to Chemical Engineering process (Vol. 63 No. 4).

SUMMARY OF THE INVENTION

An object of the present invention is to provide apparatus suitable for substantially larger throughput quantities than the devices known heretofore, yet maintaining the initial investment costs at a low level even if the arrangement is designed for higher pressures.

Upon further study of the specification and appended claims, further objects and advantages of this invention will become apparent to those skilled in the art.

These objects are attained by disposing the cell block and at least a part of the devices for the cleaning, cooling, and circulation of the electrolyte within a pressure vessel designed to withstand pressures of at least 1.1 bars and preferably in the range of 20 to 200 bars. The design of such pressure vessels is conventional, reference, for example being directed to "American Society of Mechanical Engineers, Section VIII".

The feature of this invention of accommodating the auxiliary devices for the cleaning, cooling, and circulation of the electrolyte in a pressure vessel together with the cell block (the assembly of cells) results in a considerable lowering of the manufacturing costs for the apparatus.

Since, if all auxiliary devices are located within the pressure vessel, the apparatus can also be set up in the open air, the expenses for the creation of the entire plant are moreover considerably reduced.

Due to the fact that the cell block, according to the invention, is arranged in a pressure vessel, the cell block need not withstand any pressure difference. Thanks to this favorable circumstance, the cell block can be composed in a module arrangement of square cell units. Besides, the separator sheets, which generally exhibit nub-like embossings, can be manufactured by a stepwise embossing method. This markedly reduces the manufacturing costs for the cells. Furthermore, the investment costs when designing the apparatus for higher pressures no longer rise as drastically as has been the case in connection with the devices known heretofore.

Suitably, the mountings for the cell block and the current leads are firmly joined exclusively to one side of the pressure jacket, so that the cell block can expand unhindered upon heating. This mode of construction is made possible by arranging the cells in a U-shaped turn, according to a particularly further development of the idea of this invention.

In accordance with an especially advantageous embodiment of the invention, inlet ports for the electrolytic fluid are located on the underside of the cell block. The outlet ports for the product gases and the liquid are disposed on the topside of the cell block. The liquid is entrained by the rising electrolysis gases. In this way, the necessary electrolyte circulation is accomplished.

Due to the fact that the seals between the cells need not withstand any pressure difference, these seals can be made from a ceramic material, in accordance with another embodiment of the present invention. This opens up the possibility of operating the plant at substantially higher temperatures than those used in conventional plants.

The accommodation of the cleaning arrangement in the pressure vessel leads to an essential reduction in the expenses for the plant. However, the problem is encountered in this connection that the filter media must be renewed from time to time. Particularly advantageous is an embodiment wherein mat-like filters are utilized which are continuously unwound from a drum during operation and are wound up on another drum. In this way, an operation of th plant free of interruptions is the for a long period of time.

The accommodation of the cooling device for the electrolytic fluid in the pressure vessel likewise contributes toward lowering the investment costs.

In accordance with another advantageous embodiment, the particular electrolysis gas collected in the space between the cell block and the pressure jacket is previously cooled in at least one separate cooler in order to maintain the temperature of the pressure jacket at a low level. A low temperature of the pressure jacket has a favorable effect on the strength thereof. Moreover, due to the cooling action, the vapor of the electrolytic fluid, mixed together with the gas, is separated and returned to the cycle.

Owing to the fact that the cell block can be composed in a module-type arrangement of cell parcels, the problem of cleaning and servicing can be solved in a very simple way. An embodiment appears to be especially advantageous wherein the cooler, firmly joined to the cover plate, can be pulled out of the pressure jacket through a hatch. Through the thus uncovered opening, a person can enter the interior of the pressure vessel and remove with the aid of a freight crane, the cell parcels individually out of the pressure vessel.

The primary fields of application of the aforedescribed apparatus are the electrolytic separation of water and of hydrochloric acid or sodium chloride. However, exact calculations showed the outcome that, in the separation of hydrochloric acid or sodium chloride, the above-described, automatic circulation of the electrolyte is not ensured due to the high specific gravity of the gaseous chlorine. For such purposes, the invention provides that the circulation of the electrolyte is obtained by a pump arranged within the pressure jacket. The use of such a pump, however, is not limited merely to plants for the separation of hydrochloric acid. Even in plants serving for the electrolysis of water, such a pump is advantageous, since the efficiency of the electrolysis is increased by an enhanced electrolyte circulation.

DETAILED DESCRIPTION

Figure 1:
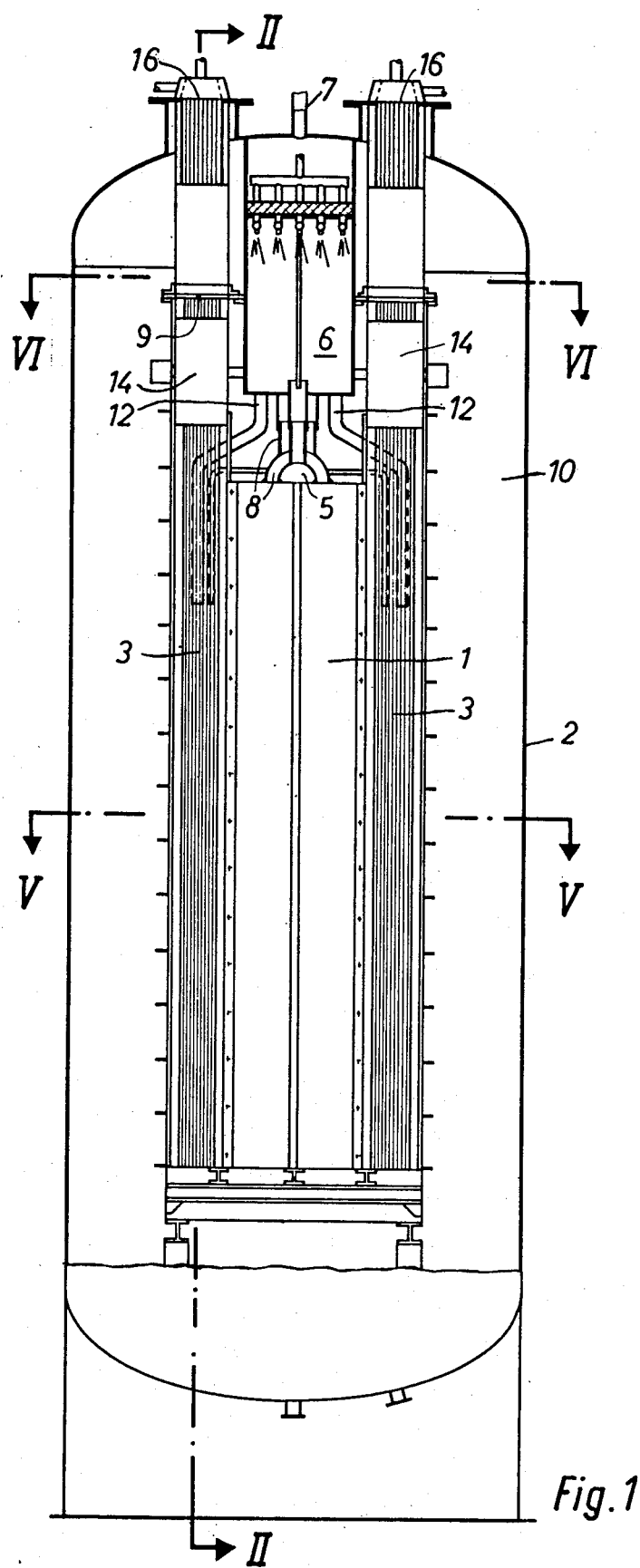
FIGS. 1 and 2 are longitudinal sectional views of an electrolysis device for water.
Figure 2:
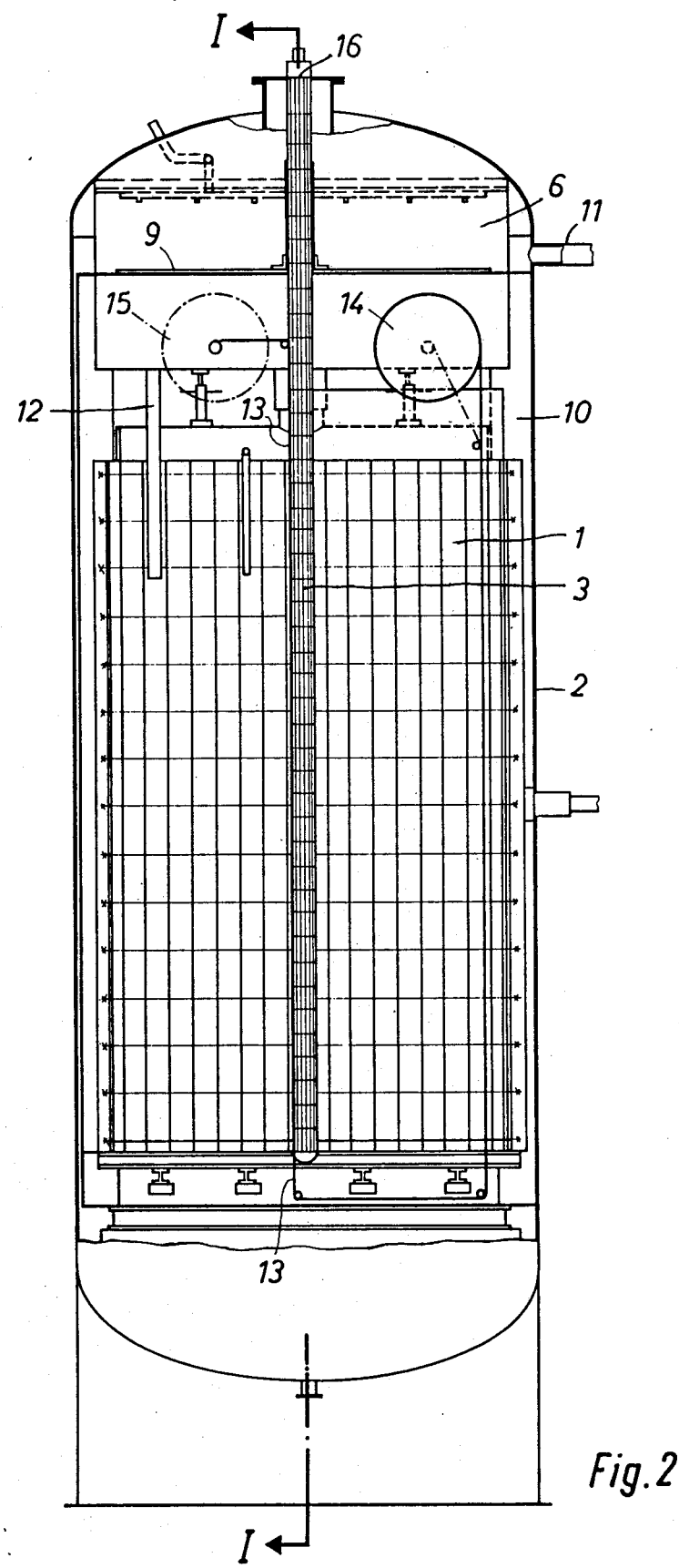
Figure 3A:
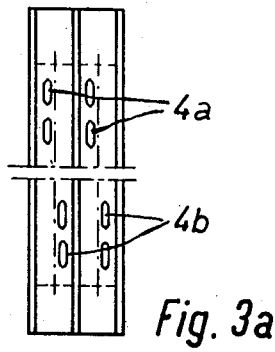
FIGS. 3a and 3b show parts of cells of the electrolysis device.
Figure 3B:
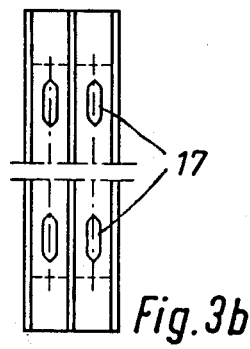
Figure 4:
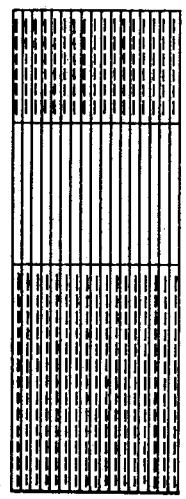
FIG. 4 shows a cell parcel from above.
Figure 5:
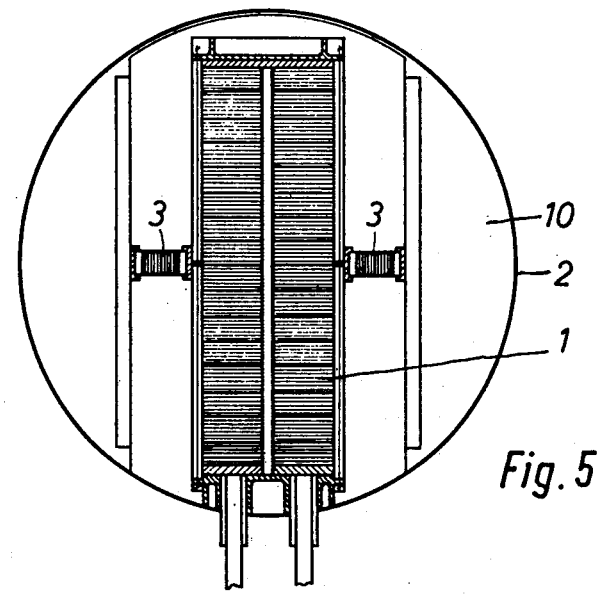
FIGS. 5 and 6 are cross sections through the electrolysis device.
Figure 6:
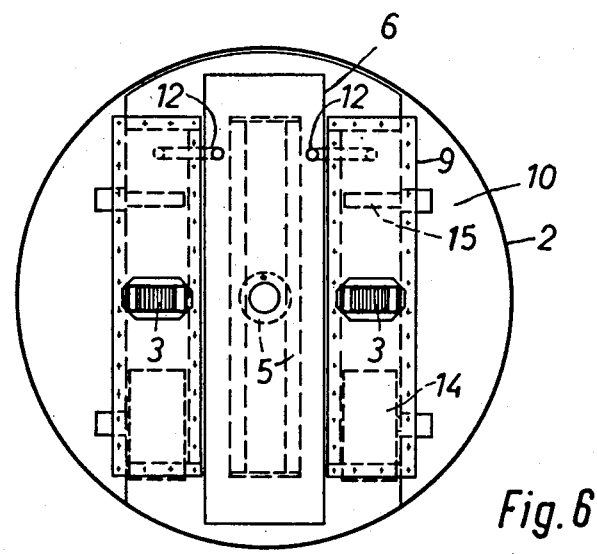

A square cell block 1 is disposed in a pressure vessel 2 (FIGS. 1, 2, 5, 6). Coolers 3 for cooling the electrolyte as well as the hydrogen gas are mounted on both sides of the cell block 1. The cells (FIGS. 3a, 3b, and 4) are constructed so that the openings 4a on the anode side of the diaphragm (openings for oxygen) are disposed at the part of the cell block 1 located toward the middle, and the openings 4b on the cathode side are located at the part of the cell block 1 on the wall side. The product oxygen is passed through the chamber 5 (FIGS. 1, 2, 6), cooled in chamber 6 countercurrently to entering feed water, and discharged from the pressure jacket via the pipe connection 7. The path along which the product oxygen is conducted is surrounded by a hollow shell 8 in which the high pressure of the feed water is ambient, in order to avoid at any event an intermixing of the oxygen with the hydrogen gas in case of a possible leakage. The hydrogen gas is forced, with the aid of a separator plate 9, to pass the upper portion of the coolers 3 before entering the outer chamber 10; via the pipe connection 11, the hydrogen gas is discharged from the plant. The electrolytic fluid is automatically circulated by the bubbles of product gases rising within the cells. The liquid leaving the cell block through the oxygen ports is combined in chamber 6 with fresh water and conducted through the two pipes 12. Care is taken, by the provision of corresponding baffles, that the electrolytic fluid must pass the two coolers before reentering the cell block from below via openings 17 (FIGS. 3, 4). Upstream of the coolers 3, filter mats 13 are arranged to clean the electrolyte; these filter mats are continuously renewed, in that they are unwound from the reel 14 and wound onto reel 15. The coolers 3 can be removed through two hatches 16, thus providing a manhole for servicing work. The cell block 1, consisting of 32 cell parcels (FIG. 4) can be lifted out of the pressure vessel parcel by parcel for servicing purposes.

Figure 7:
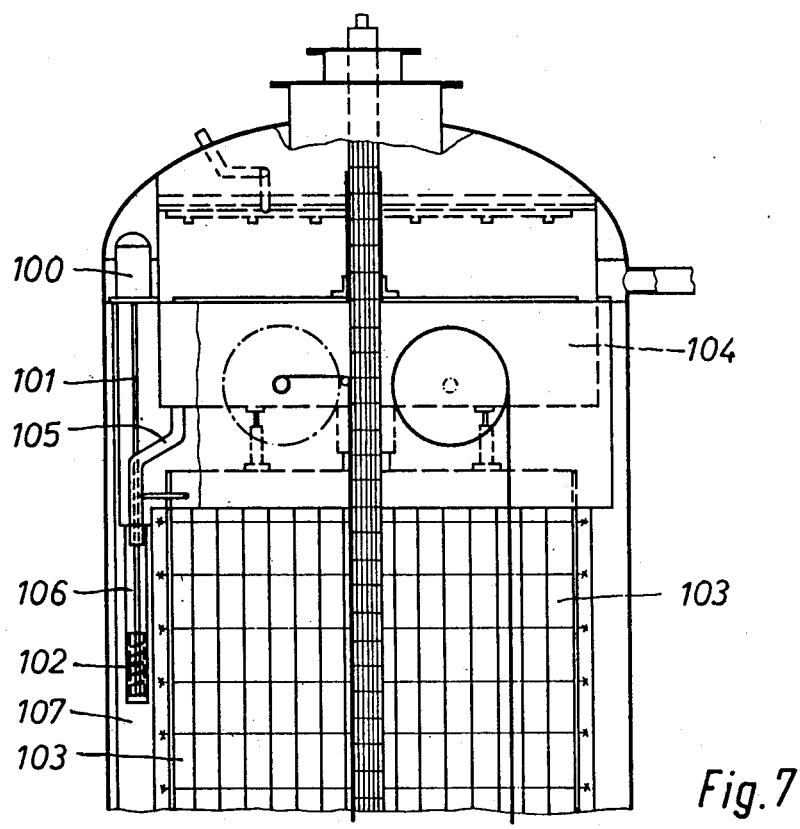
FIG. 7 is a longitudinal section through an electrolysis device for hydrochloric acid; or sodium chloride
Figure 8:
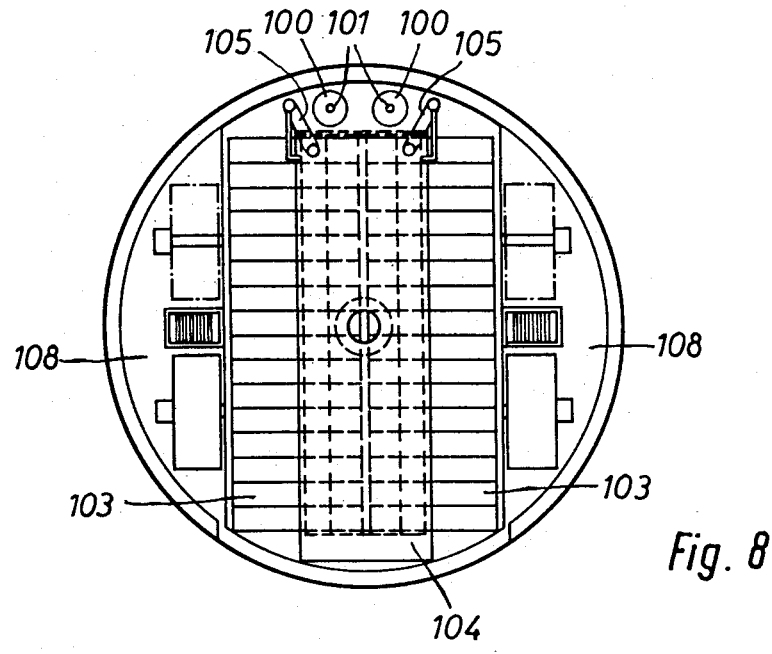
FIG. 8 shows a cross section through the electrolysis device for hydrochloric acid, or sodium chloride.

FIGS. 7 and 8 illustrate an apparatus for the separation of hydrochloric acid or sodium chloride. The acid is circulated by means of pumps. Except for this pump and a different spatial subdivision, this arrangement does not differ in principle from that shown in FIGS. 1–6. For this reason, only that portion is illustrated from which the aforementioned differences are clearly apparent.

Two pump motors are denoted by numeral 100. Numerals 101 and 102 characterize the drive shafts and two vane-type pumps, respectively.

The hydrochloric acid or sodium chloride discharged above the cell block 103, as well as the hydrochloric acid or sodium chloride exiting from chamber 104 via conduit 105, are passed via conduit 106 to the pumps 102 and are forced by the latter into the chamber 107. The pressure increase in chamber 107 results in a rise in the liquid level in chamber 108. Due to the level difference between the liquid present in chamber 108 and that present in the chamber above the cell block 103, the required liquid circulation is effected.

With an electrode surface of 6 $m^2$ per cell and a current density of 15,000 $A/m^2$, the apparatus for water electrolysis produces, in 512 series-connected cells, 20,000 $Nm^3$ of hydrogen and 10,000 $Nm^3$ of oxygen per hour. When designed for an operating pressure of 30 bars, the investment costs are less than one-quarter the expenses for the conventional devices of the same capacity. If the apparatus is operated with an electrolyte temperature of 200° C., an energy of 4.1 kwh is required for the decomposition of 1 $Nm^3$ of water, as contrasted to 4.6 – 4.8 kwh in case of conventional devices. Accordingly, it is preferred to operate the electrolyzer of this invention at about 200° to 300° C. and 10 to 200 bars for the electrolysis of water, and at 80° to 100° C. and 20 to 40 bars for the electrolysis of hydrochloric acid, or sodium chloride.

The apparatus according to the above-mentioned example has a height of 12 m and a diameter of 4 m. At bigger dimensions the apparatus may be expected to become uneconomic in view of the difficulties arising when transporting the apparatus. On the other hand as lower limit in economic view for the apparatus dimensions 4 m in height and 0.3 m in diameter (20 $Nm^3/h$ $H_2$-production) can be considered.

The Noeggerath cell is in contrast to the invention a monopolar cell. That means each cell has only one plus- and one minus pole and not the series arranged cells as shown above. Each such monopolar cell is arranged in a separate container. This however leads to high construction costs.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a pressure electrolyzer provided with bipolar electrodes forming a plurality of cell units arranged in the form of a cell block, the cell block and at least part of the devices for the cleaning, cooling and circulation of the electrolyte being disposed within a common pressure vessel, the improvement comprising said cell block having a square configuration, openings for the electrolyte being disposed on the underside of said cell block, said cells being arranged in a U-shaped turn, a mounting for the cell block and current leads attached exclusively to one end of said cell block and to one diameter of the side wall of the pressure vessel, said vessel having a cylindrical configuration, cooling means extending along the outside of said cell block, filter mat means being disposed in the flow path of the electrolyte upstream of the cooling means and means for conducting the electrolyte through said filter mat and cooling means and said openings for the electrolyte into the interior of the cell block.

2. Apparatus according to claim 1, further comprising windup drum means and unwinding drum means, said filter mat means being joined to both of said drum means.

3. Apparatus according to claim 1, further comprising ceramic seals between the cell units of the cell block.

4. Apparatus according to claim 1, further comprising cover plates, and wherein the coolers are fixedly joined to the cover plates disposed thereabove, said cover plates being removable.

5. Apparatus according to claim 4, wherein the cover plates are over hatches, for the removal of the coolers and exhibit at least the dimensions of a manhole.

6. Apparatus according to claim 5, wherein the cell units are of a size small enough to be pulled out of the pressure vessel through a hatch.

* * * * *